United States Patent Office 3,454,552
Patented July 8, 1969

---

3,454,552
DISAZO CATIONIC DYESTUFFS CONTAINING A QUATERNARY AMMONIUM GROUP
Wataru Yamaya and Sadao Fujino, Kitakyushu-shi, Japan, assignors to Mitsubishi Chemical Industries Limited, Tokyo, Japan
No Drawing. Filed July 6, 1965, Ser. No. 469,859
Claims priority, application Japan, July 23, 1964, 39/41,375; Sept. 10, 1964, 39/51,048
Int. Cl. C09b 31/02
U.S. Cl. 260—155     3 Claims

ABSTRACT OF THE DISCLOSURE

Disazo cationic dyestuffs having the formula

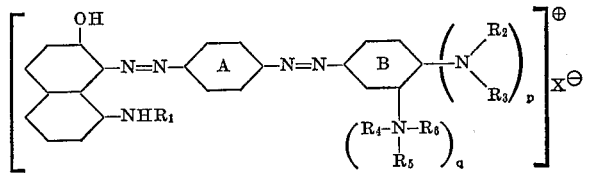

wherein A denotes 1,4-phenylene, 1,4-naphthalene or 1,4-phenylene or 1,4-naphthalene substituted by one or two chloro, bromo, methyl, methoxy, methane sulfonyl, nitro or cyano groups; B denotes phenylene or phenylene substituted by chloro, methyl or methoxy groups; $R_1$ denotes hydrogen, cyanoethyl, hydroxyethyl, dimethyl aminoethyl or γ-chloro-β-hydroxypropyl group; p and q denote an integer zero or 1, respectively, the sum of p and q being equal to 1; $R_2$ denotes hydrogen ethyl or cyanoethyl group; $R_3$ denotes trimethyl ammonium ethyl, γ-trimethylamino-β-hydroxypropyl, $$-C_2H_4(OC_2H_4)_2N(CH_3)_3$$

γ - trimethylamino - β - methoxypropyl, triethylammonium ethyl group or a β-trimethylammonium propyl group or a propyl group whose α or γ carbon atoms link said β-trimethylammonium propyl group or said propyl group to ring B at a position on ring B which is meta to the diazo group linking rings A and B; $R_4$, $R_5$ and $R_6$ denote methyl or ethyl group; and $X^⊖$ denotes anion, which dyestuffs are used for coloring natural or synthetic fibrous materials and plastics, and in particular polyacrylonitriles, with fastness to light, washing and heat.

---

This invention relates to novel disazo cationic dyestuffs.

The present invention provides new valuable cationic dyestuffs suitable for colouring natural or synthetic fibrous materials and plastics, more particularly for colouring those of the polyacrylonitrile type.

The present invention further provides a method for manufacturing said novel disazo cationic dyestuffs and a method for colouring the abovementioned fibrous materials by use of said novel disazo cationic dyestuffs.

The novel disazo cationic dyestuffs according to the present invention are indicated by the general Formula 1 which follows:

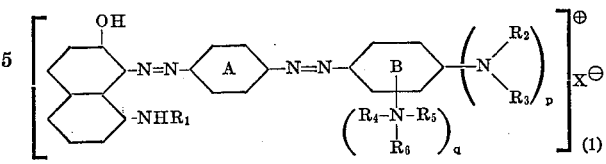

wherein A denotes 1,4-phenylene or 1,4-naphthylene residue which may be substituted by one or two radicals selected from among halogen atom, methyl, methoxy, methane sulfonyl, nitro, and cyano radical; B denotes phenylene radical which may be substituted by chlor atom, methyl or methoxy radical and in some cases may form hydroquinoline residue with —NR$_2$R$_3$ radical; $R_1$, $R_2$, and $R_3$ denotes alkyl radical having one to three carbon atoms or —CH$_2$—CH$_2$—(O—CH$_2$—CH$_2$)$_n$H, n being an integer 1 or 2, which may be substituted by chlor atom, hydroxyl, methoxy, cyano, —N—alkylamino or quaternary ammonium radical, which is indicated by the formula

$R_1$ and $R_2$ may also be hydrogen atom; $R_2$ or $R_3$ may in some cases form with nitrogen atom combined therewith and benzene nucleus hydroquinoline residue; $R_4$, $R_5$ and $R_6$ denote methyl or ethyl radical; p and q denote an integer zero or 1, the sum of p and q being 1; in the case where q is zero one of $R_1$, $R_2$, and $R_3$ has to be substituted by the above mentioned quaternary ammonium radical

and $X^-$ denotes an organic or inorganic anion.

Namely, the dyestuffs in accordance with the invention are disazo dyestuffs which have a single quaternary ammonium radical in a molecule, and $R_1$, $R_2$, and $R_3$ include hydrogen atom; alkyl radical such as methyl, ethyl, and propyl; substituted alkyl radical such as hydroxyethyl, chlorethyl, 3 - chlor - 2 - hydroxypropyl, 3 - methoxy - 2 - hydroxy-propyl and hydroxy-ethyloxyethyl; substituted alkyl radical having a secondary or tertiary amino radical such as methylamino-ethyl, dimethylamino-ethyl, 3-N-dimethylamino-propyl, and 3-N-dimethylamino-2-hydroxy-propyl; and substituted alkyl radical having quaternary ammonium radical such as trimethylammonium-ethyl, triethylammonium-ethyl, 3 - N - trimethylammonium - propyl, 3-N-trimethylammonium-2-hydroxy-propyl, 2-(2'-N-trimethylammonium-ethyl)-oxyethyl, and 2-[2'-(2''-N-trimethylaminoethyloxy)-ethyloxy]ethyl; and $R_1$ and $R_2$ may also include hydrogen atom; $R_2$ and $R_3$ may form hydroquinoline residue with nitrogen atom combined with $R_2$ and $R_3$ and benzene nucleus B, said residue including 1,2,3,4 - tetrahydroquinolinyl and 1 - N - ethyl - 3 - trimethylammonium-2,4-dihydroquinolinyl residue.

The abovementioned quaternaryammonium radicals include trimethylammonium radical, triethylammonium radical, dimethylethylammonium radical, and diethylmethylammonium radical.

The said X⁻ include the anion of formic acid, acetic acid, oxalic acid, sulfamic acid, N-substituted sulfamic acid, hydrochloric acid, sulfuric acid, perchloric acid, boric acid, or acid phosphoric acid ester of polyhydric alcohol and hydroxy ion, but in practice the anion of hydrochloric acid, sulfuric acid, or sulfamic acid and hydroxy ion are of more importance.

Various methods may be carried out to produce those novel disazo cationic dyestuffs according to the invention. For example, the novel disazo cationic dyestuffs are manufactured by a method in which an amino-azo compound indicated by the general Formula 2:

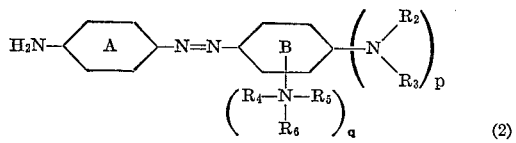
(2)

is diazotized and then coupled with a 1-amino-7-naphthol derivative which is indicated by the Formula 3:

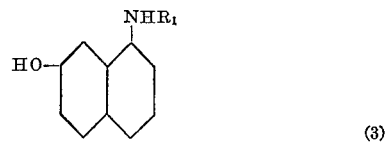
(3)

The said coupling reaction may be carried out at a low temperature in a neutral or alkaline aqueous medium.

The addition of either an organic solvent such as alcohol, acetone, dimethylformamide, and pyridine or an antioxidant such as thiosulfate in the abovementioned coupling reaction medium may give better results.

Another method of the manufacture of the novel disazo cationic dyestuffs comprises subjecting a compound as indicated by the Formula 4:

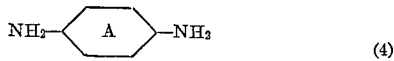
(4)

to tetraazotization and to subsequent couplings of the resultant tetra-azo compound with a coupling compound as indicated by the Formula 3 and a coupling compound as indicated by the following Formula 5, said couplings being effected in an optional sequence:

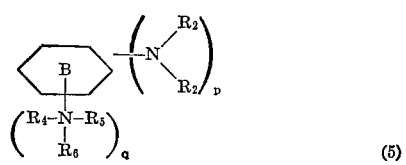
(5)

An amino-azo-compound as indicated by the Formula 2 may be manufactured by the method as follows:

An amine such as 4-nitroaniline is diazotized, the resultant is then coupled with a coupling compound as indicated by the Formula 5 to obtain a nitro azo-compound, and finally the nitro radical is reduced to amino radical after having quaternary ammonium radical introduced, if required, by the action of alkylating agent or tertiary amine.

Further, the amino-azo-compound as indicated by the Formula 2 may also be manufactured by a method in which a compound of the following Formula 6:

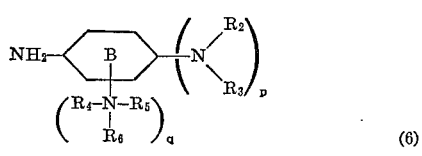
(6)

is diazotized and subsequently coupled with an aromatic amine as indicated by the Formula 7:

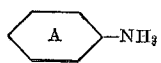
(7)

in which A is identical in significance with the A in the Formula 1.

The coupling compounds as indicated by the Formula 3 may include alkylamino-naphthols such as 1-amino-7-naphthol, 1-ethylamino-7-naphthol, and 1-ethylamino-7-naphthol; and substituted alkylamino-naphthols such as 1-(3'-chlor-2'-hydroxy-propyl)-amino-7-naphthol, 1-(3'-methoxy-2'-hydroxy-propyl)-amino-7-naphthol, 1-(dimethyl-aminoethyl)-amino-7-naphthol, and 1-(trimethyl-ammoniumethyl)-amino-7-naphthol.

The disazo dyestuffs formed in accordance with the foregoing process are filtered and dried. Yield of the dye cake is usually improved by the addition of sodium chloride, zinc chloride, kalium perchlorate or other inorganic salt to the reaction mass. In some cases, the dyestuffs are separated as free base and mixed with an appropriate acid such as sulfamic acid or phosphoric acid esters. The dyestuff salt thus obtained often shows improved solubility to water than those of conventional hydrochloric or sulfuric acid salt.

The dry dyestuff cake is usually ground and mixed with inert diluents such as sugar, dextrin, boric acid, or other solid acids and/or salts. Sometimes the dyestuff salt (sulfamic or phosphoric acid ester salt) is dissolved with or without an addition of acid in an aqueous water soluble organic solvent in a quantity one to five times the weight of said dyestuff salt which solvent may be diethylene glycol, ethylcarbitol, butylcarbitol, or thiodiethylene glycol. The resultant concentrated liquid type dyestuff composition containing 10–50% dyestuff is soluble in water.

The disazo cationic dyestuffs in accordance with the invention give fast reddish, bluish, greenish gray, or black shades to various materials including synthetic fibres such as polyacrylonitrile fibres, polyamide fibers and cellulose acetate, natural fibers such as cotton, silk, and wool, and woven or knitted fabrics thereof and plastics.

The dyestuffs in accordance with the invention are especially useful for dyeing polyacrylonitrile fibers made from either homopolymers or copolymers in deep black shades having the fastness to light, washing and heat.

The typical acrylonitrile fibers include Orlon, Acrylan, Dynel, Zefran and Vonnel.

Known processes in the prior art for dyeing may be carried out by the use of our novel disazo cationic dyestuffs. For example, dyeing of polyacrylonitrile fiber is performed usually in an acidic, neutral, or weak alkaline aqueous medium, preferably in a weak acidic or weak alkaline aqueous medium. The temperature at which dyeing begins varies usually in the range from room temperatures to 100° C., depending on the nature of material to be dyed; auxiliary may be employed when desired. The dyeing begins and continues usually at a temperature from 90° C. to 100° C. until desired shade is attained wherein a suitable auxiliary or organic solvent such as known retarding agent or carrier may be present.

Also printing of acrylonitrile fibers by use of the dyestuffs according to the invention may be carried out in conventional manner. If required a thickner such as Nafka crystal gum or starch, solubilizing agent such as urea or thiodiethylene glycol, stabilizer such as acetic, formic or tartaric acid, accelerator such as resorcinol, and if required anti-reducing agent may be added to a colour paste made from a dyestuff of the Formula 1 which is printed on aforesaid materials to be subjected to subsequent steaming for 10–60 minutes at a temperature 90–105° C., followed by rinsing and drying.

The dyeing of polyamide fiber, wool, silk or cellulosic materials may be performed directly from an aqueous dye bath with or without tannin treatment. Fastness of the dyeings are not sufficient as compared with that of polyacrylonitrile fibers.

The process according to the invention is illustrated in the following examples wherein "part" and "percent" implies "part by weight" and "percent by weight," respectively, and the maximum wave length implies the absorption wave length of visible range measured in a methanol solution containing 0.1% acetic acid.

Example 1

An aqueous solution containing 26 parts of 4-amino-4'-(N - ethyl - N - β - trimethylammoniumethyl) - aminoazobenzenchloride was added under ice cooling to an aqueous solution containing 22 parts of hydrochloric acid and 7.2 parts of sodium nitrite. The resultant solution was added to a quantity of sulfamic acid to decompose excess nitrite and filtered while cooling to remove insoluble matter. 11.1 parts of 1-amino-7-naphthol were dissolved in a mixture of 250 parts of water, 2.8 parts of caustic soda and 30 parts of soda ash to which the abovementioned diazo solution was added dropwise at a temperature below 5° C. The reaction mixture was neutralized by hydrochloric acid and precipitated dyestuff was then collected. The dyestuff thus obtained had a structure as shown by the following formula, indicating maximum absorption wave lengths at 422 mμ and 575 mμ. The dyestuff gave polyacrylonitrile fibers in a weak acid solution pure black shades fast to light, washing and heat treatment.

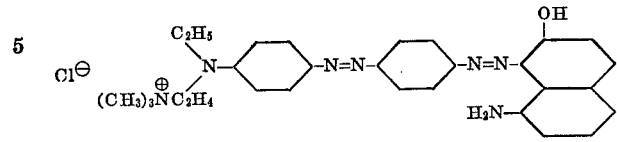

Example 2

The same method as in Example 1 was carried out in diazotizing aminoazo compounds as indicated in column A of the following Table 1. The diazotized compounds thus obtained were coupled with aminonaphthols as indicated in column B of the table to yield dyestuffs which dyed polyacrylonitrile fibers in such shades as shown in column C of the table. The maximum absorption wave lengths of the dyestuffs are shown in column D of the table.

TABLE 1

| No. | A | B | C | D (mμ) |
|---|---|---|---|---|
| 1 | (structure with Cl substituent) | 1-amino-7-naphthol | Black | 535, 475 |
| 2 | (structure with H₃C substituent) | do | do | 423, 578 |
| 3 | (structure with H₃CO substituent, A) | do | Greenish black | 425, 586 |
| 4 | (structure with (CH₃)₃NCH₂CHCH₂/CH and Cl) | do | do | |
| 5 | (structure with SO₂CH₃ substituent) | do | Black | 481, 580 |
| 6 | (structure with NO₂ substituent) | do | Violet black | 422, 564 |
| 7 | (structure with Cl and CH₃ substituents) | do | do | 438, 580 |
| 8 | (structure with CN and CH₃ substituents) | do | do | |
| 9 | (structure with (CH₃)₃N—CH—CH₂ and Cl) | 1-amino-7-naphthol | Reddish violet black | 438, 578 |

TABLE I—Continued

| No. | A | B | C | D (mμ) |
|---|---|---|---|---|
| 10 | $CNC_2H_4$–N(–$C_2H_4\overset{\oplus}{N}(CH_3)_3$)–C_6H_4–N=N–C_6H_4–NH_2 · Cl | 1-amino-7-naphthol | Greenish black | |
| 11 | $C_2H_5$–N(–$C_2H_4O$–$C_2H_4$–O–$H_4C_2\overset{\oplus}{N}(CH_3)_3$)–C_6H_4–N=N–C_6H_4–NH_2 | do | Black | 443, 593 |
| 12 | $C_2H_5$–N(–$C_2H_4O$–$C_2H_4$–O–$H_4C_2\overset{\oplus}{N}(CH_3)_3$)–C_6H_4–N=N–C_6H_4–NH_2 | 1-(3′-chloro-2′-hydroxypropyl)-amino-7-naphthol | Greenish black | 452, 610 |
| 13 | $C_2H_5$–N(–$(CH_3)_3\overset{\oplus}{N}C_2H_4$)–C_6H_4–N=N–C_6H_4–NH_2 | 1-(dimethylaminoethyl)-amino-7-naphthol | do | 423, 585 |
| 14 | $C_2H_5$–N(–$(CH_3)_3\overset{\oplus}{N}C_2H_4$)–C_6H_4–N=N–C_6H_4–NH_2 | 1-(trimethylammoniummethyl)-amino-7-naphthol | do | |
| 15 | $C_2H_5$–N(–$(CH_3)_3\overset{\oplus}{N}C_2H_4$)–C_6H_4–N=N–C_6H_4–NH_2 | 1-β-cyanoethylamino-7-naphthol | do | 595 |
| 16 | $C_2H_5$–N(–$(CH_3)_3\overset{\oplus}{N}C_2H_4$)–C_6H_4–N=N–C_6H_4–NH_2 | 1-β-hydroxyethyl-amino-7-naphthol | do | 598 |

Example 3

31.3 parts of hydrochloric acid were added to 2,000 parts of an aqueous solution containing 0.05 mol of 4-amino - 2 - methylazobenzen - 3′ - trimethylammoniumchloride to which were added at a temperature from 10° to 15° C. 30 parts of an aqueous solution containing 7 parts of sodium nitrite, and the whole was stirred for 2 hours. The excess nitrite was decomposed by the addition of sulfamic acid. The diazotized solution thus obtained was added in drops to an aqueous solution containing 15.9 parts of 1-amino-7-naphthol, 4 parts of caustic soda, and 42 parts of soda ash to complete coupling. The reaction solution was neutralized by the addition of hydrochloric acid and precipitated dyestuff was filtered and dried. The thus obtained dyestuff having a structure as indicated below showed the maximum absorption wave lengths at 574 mμ and 385 mμ. The dyestuffs gave polyacrylonitrile fibers bluish black shades fast to light, washing and heat treatment.

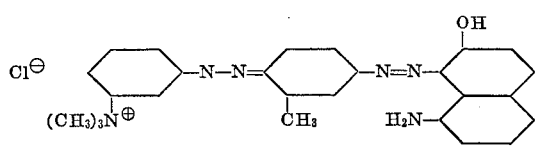

Example 4

3.1 parts of 4-amino-2,5-dimethoxyazobenzen-3′-trimethyl ammonium chloride were dissolved in a mixture of 250 parts of warm water and 3.2 parts of hydrochloric acid and cooled to a temperature from 0° to 5° C. 3 parts of an aqueous solution containing 0.7 part of sodium nitrite were added thereto while stirring. After 2 hours excess nitrite was decomposed. The thus obtained diazotized solution was added dropwise at a temperature from 0° to 5° C. to 25 parts of an aqueous solution containing 1.6 parts of 1-amino-7-naphthol, 0.4 part of caustic soda and 4.2 parts of soda ash to complete coupling. After an hour hydrochloric acid was added to the reaction mass and the whole was neutralized to pH 5. 50 parts of sodium chloride were then added and precipitated dyestuff was collected. The thus obtained dyestuff having a structure as shown in the following indicated the maximum absorption wave lengths at 605 mμ and 440 mμ. The dyestuff dyed polyacrylonitrile fibers in dark bluish green shades fast to light, washing and heat treatment.

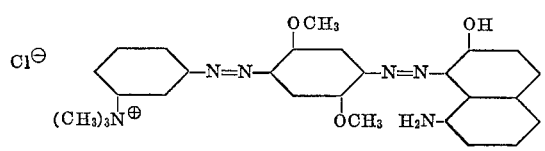

Example 5

The similar method to that in foregoing examples was performed for diazotizing the aminoazo compounds as indicated in column A of the following Table 2. The resultant diazotized products were coupled with aminonaphthols as indicated in column B of the table to obtain dyestuffs which dyed polyacrylonitrile fibers in fast shades indicated, respectively, in column C of the table. The maximum absorption wave lengths of each of dyestuffs are shown in column D of the table.

TABLE 2

| No. | A | B | C | D(mμ) |
|---|---|---|---|---|
| 1 | (CH₃)₃N⁺—⟨ ⟩—N=N—⟨ ⟩(CH₃)—NH₂ | 1-methylamino-7-naphthol | Dark green | |
| 2 | Same as above | 1-(3-chlor-2-hydroxypropyl)-amino-7-naphthol | do | 569, 390 |
| 3 | (CH₃)₃N⁺—⟨ ⟩—N=N—⟨ ⟩(OCH₃)(CH₃)—NH₂ | 1-amino-7-naphthol | Dark bluish green | 595, 425 |
| 4 | (C₂H₅)₃N⁺—⟨ ⟩—N=N—⟨ ⟩(CH₃)—NH₂ | 1-amino-7-naphthol | Bluish black | |
| 5 | (C₂H₅)₂N⁺(CH₃)—⟨ ⟩(CH₃)—N=N—⟨ ⟩—NH₂ | do | Dark violet | |
| 6 | (CH₃)₃N⁺—⟨ ⟩—N=N—⟨ ⟩(CH₃)—NH₂ | do | do | 568, 390 |
| 7 | (CH₃)₃N⁺—⟨ ⟩—N=N—⟨naphthyl⟩—NH₂ | do | Dark green | 602, 442 |
| 8 | (CH₃)₃N⁺—⟨ ⟩(CH₃)(OCH₃)—N=N—⟨ ⟩—NH₂ | do | Dark violet | |
| 9 | (CH₃)₃N⁺—⟨ ⟩—N=N—⟨ ⟩(Cl)—NH₂ | do | Bluish black | |

Example 6

0.3 part of the dyestuffs obtained in Example 1 was dissolved in 5 parts of hot water which was then diluted by addition of 400 parts of water; 0.1 part of acetic acid, 0.2 part of sodium acetate and 0.2 part of nonionic surface active agent were then added thereto to prepare a dyeing bath. 10 parts yarn of Vonnel 17 (polyacrylonitrile fibers were immersed in the said bath; the temperature of the bath was raised to 90° C. in 30 minutes; the dyeing continued at the temperature for 10 minutes and then at the boiling temperature for 1 hour. The dyed yarns were washed by water, soaped in 500 parts of a soaping bath containing 0.5% of detergent for 10 minutes at a temperature from 80° to 95° C., further washed by water and dried. Thus, the yarns were dyed to pure black with good fastness.

Further, the dye bath prepared as mentioned above was adjusted to pH 8 by sodium carbonate, boiled for 1 hour, and then adjusted to pH 4 by acetic acid. The resultant dye bath was employed for dyeing the abovementioned polyacrylonitrile fibers with a result that no appreciable differences were found in tints and shades given to the fibers.

The employment of the dyestuffs indicated below in place of the abovementioned dyestuffs resulted in giving greenish black shades:

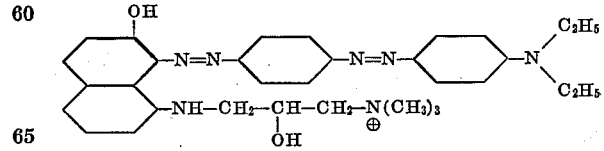

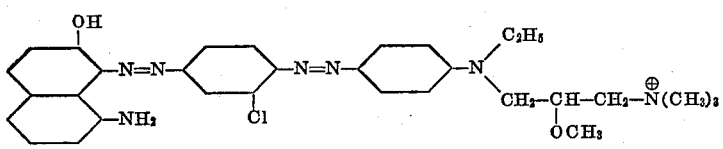

Example 7

100 parts of thickening paste were prepared by mixing 70 parts of starch paste made from 100 parts starch powder and 150 parts of water and 30 parts of Nafka crystalgum paste made from 100 parts of Nafka crystalgum and 200 parts of water.

2 parts of the dyestuffs indicated by the following formula:

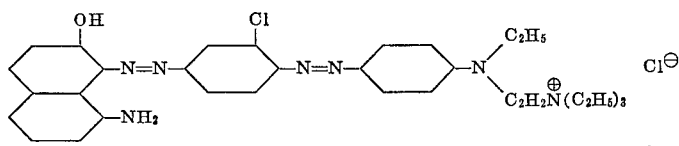

were dissolved in a mixture of 3 parts of thiodiethylenglycol (glyecine A), 1 part of urea may be added thereto if so required, 5 parts of 30% acetic acid, 2 parts of 50% tartaric acid, and an appropriate quantity of water; 60 parts of thickening paste prepared as mentioned above were mixed therewith; and finally 4 parts of resorcine were added in order to prepare 100 parts of dye paste.

Orlon (polyacrylonitrile fiber) muslin was printed by use of the abovementioned dye paste and subjected to an intermediate drying at 50° C. and subsequent steaming at 100° C. for 30 minutes. The thus obtained dyed cloth was washed by water, subjected to soaping at 70° C. for 20 minutes, further washed by water and dried. In this manner, the polyacrylonitrile fibers were printed in pure black with good fastness.

Example 8

70 parts of disazo dyestuffs cake containing 75% of free base of the disazo dyestuffs used in Example 1 were dissolved in a mixture of 20 parts of sulfamic acid, 50 parts of water and 70 parts of diethyleneglycol. The resultant solution was screened to obtain 210 parts of homogeneous solution.

The solution contained approximately 29% of the dyestuff as a sulfamic acid salt. The dyestuff was very easily soluble in water and organic solvent such as ethylenglycol and useful for colouring fibers and for manufacturing ink. Similar solution may also be prepared by the use of the dyestuffs as indicated below:

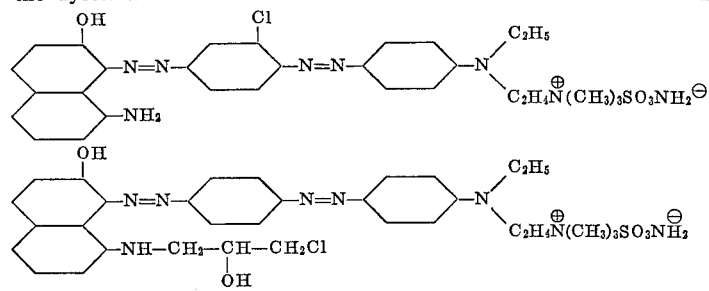

What we claim is:
1. Disazo cationic dyestuffs having the formula

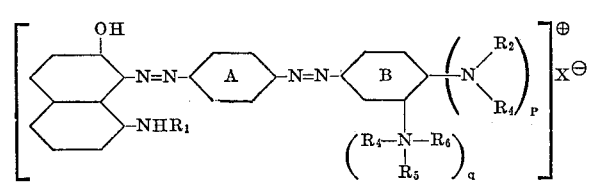

wherein A denotes 1,4-phenylene, 1,4-naphthalene or 1,4-phenylene or 1,4-naphthalene substituted by one or two chloro, bromo, methyl, methoxy, methane sulfonyl, nitro or cyano groups; B denotes phenylene or phenylene substituted by chloro, methyl or methoxy groups; $R_1$ denotes hydrogen, cyanoethyl, hydroxyethyl, dimethylaminoethyl or γ-chloro-β-hydroxypropyl group; $p$ and $q$ denote an integer zero or 1, respectively, the sum of $p$ and $q$ being equal to 1; $R_2$ denotes hydrogen, ethyl or cyanoethyl group; $R_3$ denotes trimethyl ammonium ethyl, γ-trimethylamino - β - hydroxypropyl, —$C_2H_4(OC_2H_4)_2N(CH_3)_3$, γ-trimethylamino - β - methoxypropyl, triethylammonium ethyl group or a β-trimethylammonium propyl group or a propyl group whose α or γ carbon atoms link said β-trimethylammonium propyl group or said propyl group to ring B at a position on ring B which is meta to the diazo group linking rings A and B; $R_4$, $R_5$ and $R_6$ denote methyl or ethyl group; and $X^\ominus$ denotes anion.

2. Disazo cationic dyestuffs as indicated by the formula

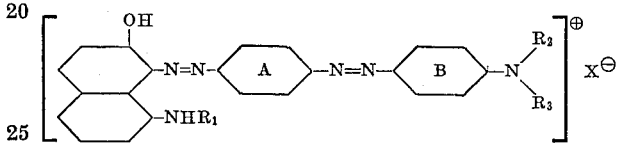

wherein A, B, $R_1$, $R_2$, $R_3$ and $X^\ominus$ are as defined in claim 1.

3. Disazo cationic dyestuffs as indicated by the formula

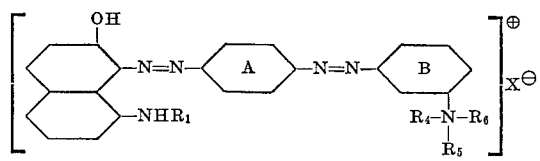

wherein A, B, $R_1$, $R_4$, $R_5$, $R_6$ and $X^\ominus$ are as defined in claim 1.

References Cited

UNITED STATES PATENTS

| | | | |
|---|---|---|---|
| 602,637 | 4/1898 | Konig | 260—191 |
| 602,640 | 4/1898 | Konig | 260—191 |
| 602,641 | 4/1898 | Konig | 260—191 |
| 677,228 | 6/1901 | Julius | 260—177 |
| 1,028,140 | 6/1912 | Scholl | 260—191 |
| 1,029,639 | 6/1912 | Scholl | 260—191 |
| 1,914,549 | 6/1933 | Woodward | 260—191 XR |
| 2,148,252 | 2/1939 | Zwilgmeyer | 260—191 XR |
| 2,244,339 | 6/1941 | Kvalnes | 260—191 |
| 2,729,630 | 1/1956 | Krzikalla et al. | 260—177 XR |
| 2,803,625 | 8/1957 | Putter | 260—191 XR |
| 2,945,849 | 7/1960 | Kruckenberg et al. | 260—191 XR |

FLOYD D. HIGEL, *Primary Examiner.*

U.S. Cl. X.R.

8—4, 41, 50, 63, 71; 106—22; 117—138.8, 144; 260—177, 190, 191, 37, 205